United States Patent Office 3,437,546
Patented Apr. 8, 1969

3,437,546
SPIRAL-WOUND DISC FRICTION ELEMENT AND
METHOD OF MAKING SAME
Frank Lombardy, Somerville, N.J., assignor to Johns-Manville Corporation, New York, N.Y., a corporation of New York
No Drawing. Filed May 24, 1965, Ser. No. 458,469
Int. Cl. D04h 13/00; B32b 19/00
U.S. Cl. 161—35                                                8 Claims

ABSTRACT OF THE DISCLOSURE

A clutch facing disc comprising a pressed helically wound disc in which rubber-coated asbestos fibers are convolutely wound in disc-form outwardly until the diameter of the disc is at a predetermined diameter, the disc being characterized by a particular rubber-coating composition adaptable for application directly from a solution and/or suspension to the asbestos fibers, the composition typically comprising butadiene styrene rubber copolymer at about 23.2%, phenol-formaldehyde thermosetting resin at about 18.2%, polymerized cashew nut shell liquid resin at about 10%, zinc oxide at about 12.6%, carbon black at about 13.7%, sulfur at about 7.8%, barytes at about 14%, and rubber accelerator at about 0.5%.

---

This invention relates to an improved method in the manufacture of friction elements for use as clutch facings and the like, and in particular the invention comprises improvements in the formation of circular, convoluted or spiral-wound disc-type friction elements.

Circular or disc friction elements such as clutch facings, etc., are commonly formed by helically or spirally winding yarn, or strands thereof, normally impregnated with an organic friction composition, convolutely about itself as is illustrated in U.S. Letters Patent No. 2,258,237. This type or form of construction exhibits a pronounced tendency to warp or distort out of plane because of inherent unequal internal stresses of the yarn or strand coiled about itself, and this warping effect or the degree thereof is significantly more prevalent and aggravated in the larger diameter disc friction elements wherein it comprises a major handicap in their manufacture and a cause of a high rate of rejects. The extent and import of the warpage problem has prompted many proposed solutions or means of overcoming this deficiency of spiral-wound clutch discs, for example, waved or crisscross coiling of the strands in winding the disc as shown in U.S. Letters Patent No. 2,263,500, or crimping as employed in the means of U.S. Letters Patent No. 2,724,671 and No. 3,118,527. However, although such prior techniques have been highly effective in overcoming or reducing the warpage problem, they all entail extensive additional steps or operations in the manufacturing procedures which appreciably add to the costs of production.

It is the primary object of this invention to provide an improved method of manufacturing spiral-wound or convoluted yarn disc friction elements which obviates or reduces warpage to a negligible degree and which is more economical than prior production means in eliminating steps or operations of previous processes, reducing material and handling costs, and, in general upgrades the quality of the product.

It is also an object of this invention to provide an improved method for the manufacture of helically or spirally wound disc friction elements of improved stiffness and flatness and which effectively and enduringly resist distortion and warpage.

These and other objects and advantages of this invention will become more apparent from the hereinafter detailed description and examples thereof.

This invention, in part, comprises an improved manufacturing procedure set forth in detail hereinafter, over common prior art techniques such as described in the aforesaid mentioned Patents Nos. 2,724,671 and 3,118,527 and as such the disclosures of said patents comprising the friction materials or ingredients, means, operations, etc. are all incorporated herein by reference as establishing the state of the art and certain phases, operations, ingredients, and elements thereof common to the present invention.

As indicated above, this invention consists primarily of an improved manufacturing procedure including a specific formulation for the organic friction composition composed of known constituents, and comprises a combination of steps or operations and ingredients which collectively cooperate, or the overall mutual effects thereof is to provide friction disc products of a high degree of stiffness and lasting resistance to warpage and wherein the overall manufacturing procedure eliminates certain operations or means previously considered necessary to achieve like results.

Specifically, the improved method of this invention comprises a basic combination of the steps of:

(a) Providing or forming a liquid rubber friction composition by dispersing a rubber friction material of the formation set forth hereinafter, and dissolving the rubber content thereof in a volatile rubber solvent, such as gasoline;

(b) saturating an asbestos yarn, or strands thereof, in the liquid rubber composition to effect a pickup or retention thereof of approximately 40 to 60% of the rubber friction composition solids from the liquid, by weight of the treated yarn, then evaporating the solvent off;

(c) helically coiling the rubber compound saturated asbestos yarn or strands thereof convolutely about itself forming a disc blank of apt diameter and thickness;

(d) pressing the blank disc in a direction perpendicular to its axis while subjecting it to elevated temperatures to uniformly consolidate its mass and distribute the rubber composition throughout; and, (e) thermally curing the rubber friction composition content of the blank disc while maintaining the same under pressure.

The formulation of the rubber friction composition or combination of ingredients thereof required for use in the improved method of this invention, in approximate percentages by weight, consists essentially of:

| | Percent |
|---|---|
| Rubber, either natural or synthetic | 16–24 |
| Thermosetting resin | 18–30 |
| Zinc oxide | 10–20 |
| Carbon black | 12–20 |
| Sulfur | 6–14 |
| Barytes | 13–22 |
| Apt rubber accelerator | 0.5–1 |

The preferred rubber friction composition of the method of this invention comprises, in approximate percentages by weight:

| | Percent |
|---|---|
| Rubber | 18–22 |
| Thermosetting resin | 20–24 |
| Zinc oxide | 12–18 |
| Carbon black | 14–18 |
| Sulfur | 8–12 |
| Barytes | 15–20 |
| Accelerator | 0.5–1 |

The rubber of the friction composition preferably comprises the butadiene-styrene copolymers commonly utilized in friction compositions, but may include other rubber compositions comprising natural rubber, Buna N or butadiene-acrylonitrile polymers, butyl rubbers, and the like elastomers which will not pass through an inversion or softening point during the heat hardening cure or in use. Moreover, the rubber should be in crumb or readily dispersible and dissolvable particulate form to facilitate dissolution and dissolving in the volatile rubber solvent. The resin component comprises granules of common thermosetting resins such as phenol-formaledhyde condensates or polymerized cashew nut shell oil which are heat curable to an insoluble and fusible thermoset state. The more high temperature resistant phenol-formaldehyde resins typically incorporated in friction products are preferred.

The rubber component, either purchased as crumb or granulated from sheeted stock, is dispersed in an apt volatile solvent for such compositions, including gasoline, carbon disulfide, methyl ethyl ketone, hexane or the like readily effective solvents for rubbers. Upon effectively dispersing and substantially dissolving the rubber component, the balance of the ingredients comprising the resin particles and apt rubber compounding agents are added and dispersed throughout the rubber containing solvent by mixing the same and adjusting the consistency through the addition of further solvent until the composition forms a readily workable liquid of approximately 28 to 30° Bé.

The asbestos yarn, which may be wire reinforced or comprise other conventional carrying fibres or components, or multiple, twisted or woven strands thereof, are impregnated with the liquid friction composition by running the yarn or strands through the liquid solution and controlling the pickup by any apt means to provide a friction composition content therein of between about 40 to 60% of rubber friction composition solids by weight of the yarn. The impregnated yarn, etc., is then dried by evaporation of the solvent through any common means such as a drying tower whereupon the yarn either in an individual strand or apt combinations or weave thereof and depending upon the thickness desired, is ready for the coiling fabrication of the disc blank. The formation of disc blanks, such as typical cylindrical clutch facings, may be carried out by any convenient and conventional winding technique and mechanism of helically or spirally winding the yarn convolutely about itself on a mandrel to form a relatively narrow disc or apt thickness and circumferential dimensions. However, prior techniques of mitigating warpage such as waving or crisscrossing the spirally yarn across the diameter of the disc face, or crimping the yarn prior to winding, etc., illustrated in the prior art may be disregarded as superfluous insofar as overcoming warping tendencies.

When wound to the designed circumferential diameter the blanks are removed from the winding mandrel and pressed at pressures above about 2,000 p.s.i. between heated platens of at least 300° F. for a period typically of approximately 4 minutes to consolidate the blank and distribute the rubber friction composition uniformly throughout and eliminate voids. The disc blanks are then cured under pressure which may be conveniently effected by stacking the blanks between rigid metal plates, clamping the end plates and exposing the clamping assemblage to suitable thermal curing or vulcanizing conditions, as for example, approximately 4 to 8 hours at temperatures of about 350 to 400° F. Upon completion of the thermal curing and cooling, the blanks are ready for grinding to desired tolerances, and boring as required.

The following comprise examples illustrating suitable and preferred improved methods of this invention for the manufacture of disc clutch facings free of discernible warpage and distortion. It is to be understood that the mixing or dispersing means, the particular constituents of the friction material formulation, the winding, pressing and curing conditions, etc. given in these examples are exemplary and not to be considered to limit this invention to any specific component(s) or condition(s) recited in the hereinafter examples:

EXAMPLE I

A preferred procedure including composition of this invention for typical automotive disc clutch facings of improved stiffness or flatness and resistance to distortion and warpage comprises the following combination of steps. The rubber, comprising 153.6 pounds of crumb butadiene styrene copolymer, SBR–106 Rubber Institute designation, was added to 216 gallons of gasoline in a Struthers Wells mixer and blended for 2 hours dissolving it to a smooth, creamy consistency. To this solution 130.4 pounds of carbon black were added and mixed for 10 to 15 minutes, followed by the addition of 176 pounds of granular phenol-formaldehyde resin (DRB 5933, Bakelite Division of Union Carbide Corp.), 123.2 pounds of zinc oxide, 76.8 pounds of sulfur, 136.0 pounds of barytes, and 4 pounds of rubber accelerator-DOTG (diorthotolylguanidine), followed by ½ hour to one hour mixing. Small additional quantities of gasoline were added during the final mixing to effect a viscosity of 28 to 30° Bé. The overall formulation of the rubber friction composition, other than the solvent, was as follows:

| Material | Percent | Pounds |
| --- | --- | --- |
| Rubber butadiene-styrene copolymer crumbs, SBR–106 | 19.2 | 153.6 |
| Phenol-formaldehyde granular resin BRP–5933 | 22.0 | 176.0 |
| Zinc oxide | 15.4 | 123.2 |
| Carbon black | 16.3 | 130.4 |
| Sulfur | 9.6 | 76.8 |
| Barytes | 17.0 | 136.0 |
| Rubber accelerator DOTG (diorthotolylguanidine) | 9.5 | 4.0 |
| Total | 100.0 | 800.0 |

Gasoline, 216.0 gallons.

A wire reinforced asbestos yarn was run through a vat of the foregoing rubber solution, then passed through a rosetta adjusted to provide a solids pickup of 48 to 52% of the rubber solution based on the weight of the yarn, and passed up through a drying tower maintained at 450° F. to evaporate a solvent whereupon the yarn was spirally wound on a mandrel and convoluted upon itself and thus formed into blanks comprising thin discs of about 0.14 inch thick and varying diameters measuring from about 6 by 9 inches up to 6 by 11 inches. Each blank upon removal from a mandrel was pressed and consolidated at a pressure of 3,000 p.s.i. between steam heated platens at a temperature of about 320° F. or 125 p.s.i. steam pressure for approximately 4 minutes to distribute the rubber composition uniformly throughout and among the layers of the yarn and eliminate voids. The consolidated blanks were stacked 50 high and placed between rigid metal plates and tightly clamped, then the assemblage thereof was baked in an oven for 6 hours at 350° F. followed by 2 hours at 400° F. to vulcanize the rubber and cure the friction composition. On completion of the curing bake, the clutch discs were cooled with a water spray and the surfaces of the facings ground to final dimensions. The thus provided clutch facings were found to be free of any tendency to distort or warp to a discernible degree including over long periods of storage or shelf-life without the application of pressure or restraining means.

EXAMPLE II

An additional series of clutch facings were produced pursuant to substantially the same procedure or series of manipulative operations as set forth in Example I except that the rubber friction material consisted of the following formulation:

| Material | Percentage | Pounds |
| --- | --- | --- |
| Rubber-butadiene-styrene copolymer crumb, SBR-1006 (Rubber Institute designation) | 23.2 | 185.6 |
| Phenol-formaldehyde resin granules-BRP-5933 Bakelite Division of Union Carbide Corp | 18.2 | 145.6 |
| Cardolite resin-polymerized cashew nut shell liquid-3521, Minnesota Mining & Mfg | 10.0 | 80.0 |
| Zinc oxide | 12.6 | 100.8 |
| Carbon black | 13.7 | 109.6 |
| Sulfur | 7.8 | 62.4 |
| Barytes | 14.0 | 112.0 |
| Rubber accelerator DOTG (diorthotolylguanidine) | 0.5 | 4.0 |
| Total | 100.0 | 800.0 |

Gasoline, 216 gallons.

A clutch disc produced according to the improved method of this invention with the foregoing composition exhibited a marked reduction in warpage over prior conventionally produced commercial clutch discs.

It will be understood that the foregoing details are given for purposes of illustration and not restriction, and that variations within the spirit of this invention are to be included within the scope of the appended claims.

What is claimed is:

1. An improved method of making warp-free, spiral-wound disc friction elements, comprising the steps of:
   (a) forming a liquid rubber friction composition by dispersing in a volatile rubber solvent and dissolving in the rubber content thereof, a rubber friction composition comprising, in approximate percentages by weight, rubber at 16.0% to 24.0%, thermosetting resin at 18.0% to 30.0%, zinc oxide at 10.0% to 20.0%, carbon black at 12.0% to 20.0%, sulfur at 6.0% to 14.0%, barytes at 13.0% to 22.0%, and rubber accelerator at 0.5% to 1.0%.
   (b) saturating an asbestos yarn in the liquid rubber composition and evaporating the solvent off;
   (c) helically coiling the rubber compound saturated asbestos yarn convolutely about itself forming a blank disc;
   (d) pressing the blank disc in a direction perpendicular to its axis at a high pressure and temperature, consolidating the yarn and friction composition; and,
   (e) thermally curing the rubber composition content of the blank disc.

2. An improved method of making warp-free, spiral-wound disc friction elements, comprising the steps of:
   (a) forming a liquid rubber friction composition by dispersing in a volatile rubber solvent and dissolving the rubber content thereof, a rubber friction composition comprising, in approximate percentages of weight, rubber at 18% to 22%, thermosetting resin at 20% to 24%, zinc oxide at 12% to 18%, carbon black at 14% to 18%, sulfur at 8% to 12%, barytes at 15% to 20%, and rubber accelerator at 0.5% to 1.0%;
   (b) saturating an asbestos yarn in the liquid rubber friction composition and evaporating the solvent off;
   (c) helically coiling the rubber compound saturated asbestos yarn convolutely about itself forming a disc blank;
   (d) pressing the blank disc in a direction perpendicular to its axis at high pressures and temperatures, consolidating the yarn and rubber friction composition of the blank; and,
   (e) thermally curing the rubber composition content of the blank disc.

3. An improved method of making warp-free, spiral-wound disc friction elements, comprising the steps of:
   (a) forming a liquid rubber friction composition by dispersing in a volatile rubber solvent and dissolving the rubber content thereof, a rubber friction composition comprising, in approximate percentages by weight, butadiene styrene rubber copolymer at 18% to 22%, phenol-formaldehyde thermosetting resin at 20% to 24%, zinc oxide at 12% to 18%, carbon black 14% to 18%, sulfur at 8% to 12%, barytes at 15% to 20%, and rubber accelerator at 0.5% to 1%;
   (b) saturating an asbestos yarn in the liquid rubber composition providing a solids pickup of about 40% to 60% by weight of the rubber composition by weight of the yarn, and evaporating the solvent off;
   (c) helically coiling the rubber compound saturated convolutely about itself forming a blank disc;
   (d) pressing the blank disc in a direction perpendicular to its axis at a temperature of at least 300° F. consolidating the yarn and rubber composition thereof; and
   (e) thermally curing the rubber composition content of the blank disc.

4. An improved method of making warp-free, spiral-wound disc friction elements, comprising the steps of:
   (a) forming a liquid rubber friction composition by dispersing in a volatile rubber solvent and dissolving the rubber content thereof, a rubber friction composition comprising, in approximate percentages by weight, butadiene styrene rubber copolymer at 18% to 22%, phenol-formaldehyde thermosetting resin at 20% to 24%, zinc oxide at 12% to 18%, carbon black at 14% to 18%, sulfur at 8% to 12%, barytes at 15% to 20%, and rubber accelerator at 0.5% to 1.0%;
   (b) saturating an asbestos yarn in the liquid rubber friction composition picking up about 48% to 52% solids of the liquid rubber composition by weight of the yarn, and evaporating the solvent off;
   (c) helically coiling the rubber compound saturated asbestos yarn convolutely about itself forming a blank disc;
   (d) pressing the blank disc in a direction perpendicular to its axis at a pressure of about 3,000 p.s.i. and a temperature of about 350 to 400° F., consolidating the yarn and rubber friction composition thereof; and,
   (e) thermally curing the rubber composition content of the blank disc by subjecting the same to temperatures approximately 350 to 400° F.

5. An improved method of making warp-free, spiral-wound disc friction elements, comprising the steps of:
   (a) forming a liquid rubber composition by dispersing in a volatile rubber solvent and dissolving the rubber content thereof, a rubber friction composition comprising, in approximate percentages by weight, butadiene styrene rubber copolymer at 19.2%, phenol-formaldehyde thermosetting resin at 22.0%, zinc oxide at 15.4%, carbon black at 16.3%, sulfur at 9.6%, barytes at 17.0%, rubber accelerator at 0.5%;
   (b) saturating an asbestos yarn in the liquid rubber friction composition picking up about 48% to 52% solids of the rubber composition by weight of the yarn, and evaporating the solvent off;
   (c) helically coiling the rubber compound saturated asbestos yarn convolutely about itself forming a blank disc;
   (d) pressing the blank disc in a direction perpendicular to its axis at a pressure of approximately 3,000 p.s.i. and at a temperature of about 300–350° F. consolidating the yarn and friction composition thereof; and,
   (e) thermally curing the rubber composition content of the blank disc at temperatures of approximately 350–400° F.

6. An improved method of making warp-free spiral-wound disc friction elements, comprising the steps of:
   (a) forming a liquid rubber composition by dispersing in a volatile rubber solvent and dissolving the rubber content thereof, a rubber friction composition comprising, in approximate percentages by weight, butadiene styrene rubber copolymer at 18.2%, polymerized cashew nut shell liquid resin at 10.0%, zinc oxide at 12.6%, carbon black at 13.7%, sulfur at 7.8%, barytes at 14.0%, and rubber accelerator at 0.5%;

(b) saturating an asbestos yarn in the liquid rubber friction composition picking up about 48% to 52% solids of the rubber composition by weight of the yarn, and evaporating the solvent off;

(c) helically coiling the rubber compound saturated asbestos yarn convolutely about itself forming a blank disc;

(d) pressing the blank disc in a direction perpendicular to its axis at a pressure of approximately 3,000 p.s.i. and at a temperature of about 300–350° F. consolidating the yarn and friction composition thereof; and, (e) thermally curing the rubber composition content of the blank disc by subjecting the same to temperatures of approximately 350–400° F.

7. A warp-free, spiral-wound disc friction element comprising a blank pressed disc of a rubber-saturated asbestos yarn helically coiled convolutely about itself sufficiently to form said blank disc, in which said rubber comprises a thermally cured composition comprising, in approximate percentages by weight, rubber at 16% to 24%, thermosetting resin at 18% to 30%, zinc oxide at 10% to 20%, carbon black at 12% to 20%, sulfur at 6% to 14%, barytes at 13% to 22%, and rubber accelerator at 0.5% to 1.0%.

8. A warp-free, spiral-wound disc friction element comprising a blank pressed disc of a rubber-saturated asbestos yarn helically coiled convolutely about itself sufficiently to form said blank disc, in which said rubber comprises a thermally cured composition comprising, in approximate percentages by weight, butadiene styrene rubber copolymer at 23.2%, phenol-formaldehyde thermosetting resin at 18.2%, polymerized cashew nut shell liquid resin at 10%, zinc oxide at 12.6%, carbon black at 13.7%, sulfur at 7.8%, barytes at 14%, and rubber accelerator at 0.5%.

References Cited
UNITED STATES PATENTS

| | | |
|---|---|---|
| 2,587,945 | 3/1952 | Wirth. |
| 2,640,795 | 6/1953 | Bertolet _____ 156—184 XR |
| 2,702,770 | 2/1955 | Steck. |

PHILIP DIER, *Primary Examiner.*

U.S. Cl. X.R.

156—173, 195, 220; 192—107